(12) United States Patent
Forbes et al.

(10) Patent No.: US 7,849,041 B2
(45) Date of Patent: Dec. 7, 2010

(54) INTENT PREDICTION AND RESPONSE EMPLOYING SENSING, NETWORKING, AND COMMUNICATION AMONG DISTRIBUTED DEVICES

(75) Inventors: Scott C. Forbes, Redmond, WA (US); Amit Mital, Kirkland, WA (US); Russell Irvin Sanchez, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 961 days.

(21) Appl. No.: 11/532,864

(22) Filed: Sep. 18, 2006

(65) Prior Publication Data

US 2008/0126284 A1    May 29, 2008

(51) Int. Cl.
*G06F 17/00* (2006.01)
(52) U.S. Cl. .................................................. 706/46
(58) Field of Classification Search ............... 340/5.31, 340/5.8, 10.5; 706/45, 46
See application file for complete search history.

(56) References Cited

U.S. PATENT DOCUMENTS

| | | | | |
|---|---|---|---|---|
| 5,889,993 | A * | 3/1999 | Kroeger et al. ........... | 717/128 |
| 2006/0010206 | A1 | 1/2006 | Apacible et al. | |
| 2006/0230272 | A1 | 10/2006 | Lawrence et al. | |
| 2006/0293893 | A1 | 12/2006 | Horvitz | |
| 2007/0005243 | A1 | 1/2007 | Horvitz et al. | |
| 2007/0006098 | A1 | 1/2007 | Krumm et al. | |
| 2007/0022075 | A1 | 1/2007 | Horvitz et al. | |
| 2007/0112767 | A1 * | 5/2007 | Tilley ....................... | 707/6 |
| 2007/0159304 | A1 * | 7/2007 | Agarwal et al. ........... | 340/10.32 |
| 2007/0290791 | A1 * | 12/2007 | Batra ........................ | 340/5.31 |

OTHER PUBLICATIONS

Hawkes, et al., "LivingSpace: A Living Worlds Implementation using an Event-based Architecture", Date:1998, http://www.hpl.hp.com/personal/Rycharde_Hawkes/publications/livingspace.pdf.
O'Madadhain, et al., "Prediction and Ranking Algorithms for Event-Based Network Data", Date: 2005, pp. 23-30, vol. 7, Issue 2, http://delivery.acm.org/10.1145/1120000/1117458/p23-omadadhain.pdf?key1=1117458&key2=0784305511&coll=GUIDE&dl=GUIDE&CFID=972688&CFTOKEN=11434700.
Rene Mayrhofer, "Context Prediction based on Context Histories: Expected Benefits, Issues and Current State-of-the-Art", http://www.ipsi.fraunhofer.de/ambiente/echise2005/papers/echise2005-s17-ContextPredictionBasedOnContextHistories-Mayrhofer.pdf.
Yang, et al. "Web-log Mining for Quantitative Temporal-Event Prediction", IEEE Computational Intelligence Bulletin, Date: Dec. 2002 vol. 1 No. 1, http://www.comp.hkbu.edu.hk/~cib/2002/cib_iss1d.pdf.
Memory Prediction Framework; http://en.wikipedia.org/wiki/memory-prediction_framework.

* cited by examiner

*Primary Examiner*—Michael B. Holmes
*Assistant Examiner*—Ola Olude Afolabi
(74) *Attorney, Agent, or Firm*—L. Alan Collins; Collins & Collins Incorporated

(57) ABSTRACT

The present invention provides, among other things, technologies for recognizing sequences of events or patterns of behavior, of predicting intent, need, objectives, purpose, aim, or the like, and responding to the predicted intent. Such technologies includes intent prediction and response ("IPR") environments and systems, as well as methods for performing aspects IPR. Such technologies may aid in accomplishing tasks more efficiently or in reducing impediments whether they be physical, environmental, social, or the like.

9 Claims, 6 Drawing Sheets

INTENT PREDICTION AND RESPONSE EMPLOYING SENSING, NETWORKING, AND COMMUNICATION AMONG DISTRIBUTED DEVICES

BACKGROUND

As computing systems and environments improve, it may be desirable to apply them to predicting intent and performing functions that aid in accomplishing tasks more efficiently. Models that represent intent, need, objective, purpose, aim, or the like, including statistical predictive models for example, may be helpful in designing and building technology that can predict intent and aid in accomplishing tasks more efficiently.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented herein later.

The present examples provide technology for recognizing sequences of events or patterns of behavior, of predicting intent or the like, and responding to the predicted intent. Such technology includes intent prediction and response ("IPR") environments and systems, as well as methods for performing aspects IPR. Such technology may aid in accomplishing tasks more efficiently or in reducing impediments whether they be physical, environmental, social, or the like.

For example, an IPR system may predict that an approaching individual intends to pass through a door. Such a system may recognize the individual, validate that the individual has the right to enter the door, and automatically open the door for the individual while offering a personalized greeting such as, "Good morning, Bob. Your first meeting begins in 10 minutes and has been moved to conference room 2156 in this building." It should be understood that many other examples could also be used to demonstrate such IPR technology.

Information or data describing various event sequences may be helpful in implementing technology that can predict intent, need, objectives, purpose, aim, or the like and aid in accomplishing tasks more efficiently. Such event sequence information may include identification of individual or group identities or other entities, indications of behavior over time, utterances of individuals directed toward one another or directed toward an intent prediction and response system, and/or explicit commands or interactions with artifacts such as physical objects, computational systems, or the like. Intent prediction and response technology may be applicable to human activity or to the activity or purpose of any entity, object, data or the like where such prediction and response could be of value.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in networking and computing environments, the environments described are provided as examples and not limitations. As those skilled in the art will appreciate, the present examples are suitable for application in a variety of different types of environments.

Figure 1:
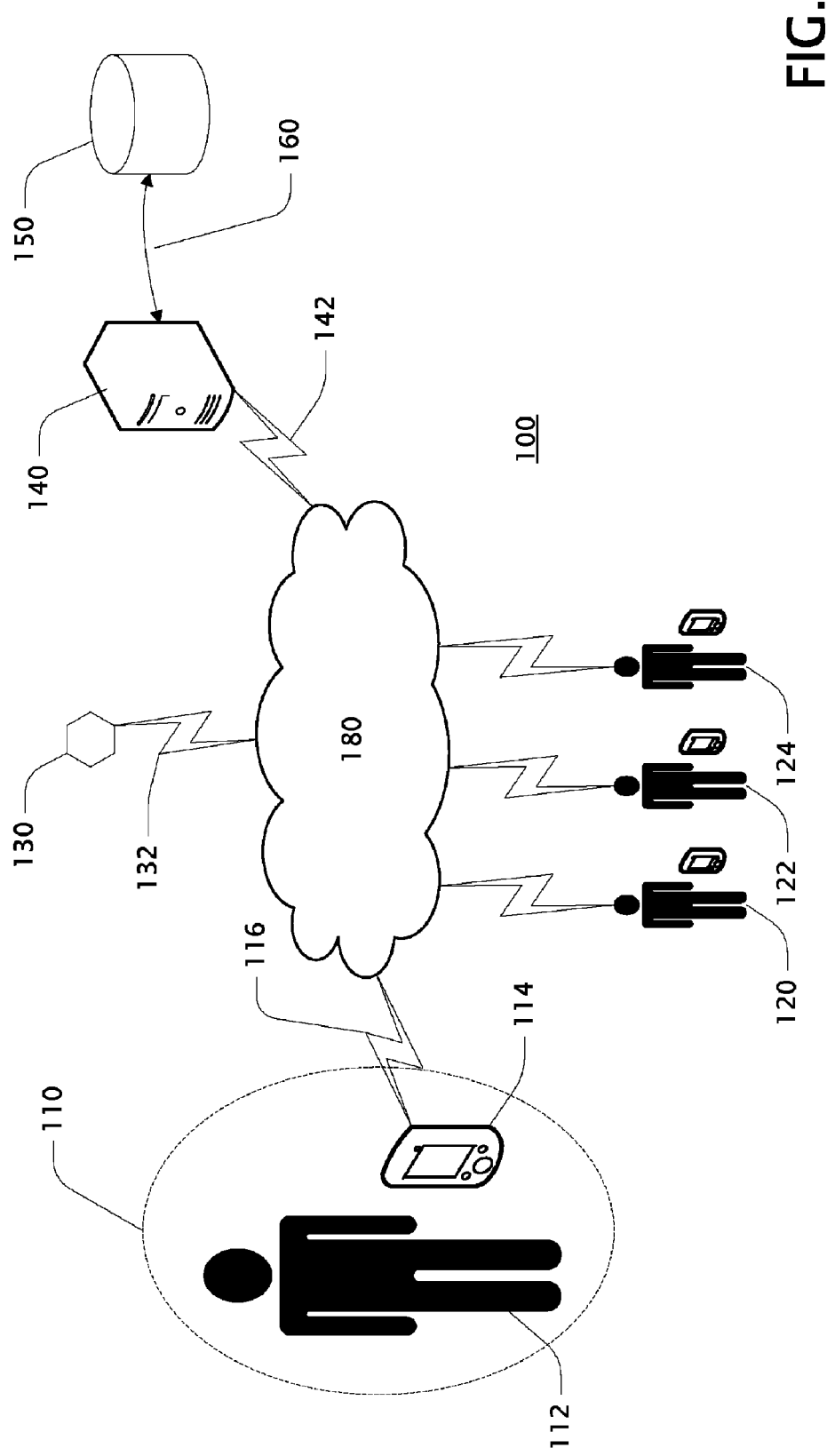
FIG. 1 is block diagram showing an example intent prediction and response ("IPR") environment.

FIG. 1 is block diagram showing an example intent prediction and response ("IPR") environment 100. Elements of IPR environment 100 may include: mobile devices, such as mobile device 114, optionally associated with entities, such as person 112, forming managed entities, such as managed entities 110, 120, 122, and 124; sensors, such as sensor 130; IPR servers, such as server 140; IPR data stores, such as database 150; and communications networks, such as network 180. An intent prediction and response system typically operates within such an IPR environment.

Example managed entity 110 includes an entity, such as person 112, and a mobile device 114. Mobile device 114 is associated with entity 112 forming a managed entity. An entity may be a person, vehicle, animal, or any other physical object, data, or the like for which intent prediction and response may be desirable. A mobile device may be a personal data assistant, cell phone, electronic bracelet, electronic tag, electronic badge, implantable device, electronic chip, computer, or the like. Such a mobile device may include a means for location tracking, such as global positioning system ("GPS") position tracking, and communication, such as wireless communication to a network such as the internet, a cellular network, a corporate network, or the like. Such a mobile device may also include computer processing capability such that intent prediction and response software and/or firmware may be operate on the device. Such a mobile device may be capable of creating and joining ad-hoc networks with other such devices, federating with other such devices, and otherwise communicating with other such devices.

Managed entities, such as entities 110, 120, 122, and 124 are typically coupled to a network, such as example network 180, via communication links, such as link 116. Such communication links may be wireless links or any other type of link suitable to the device and/or entity being managed. In one example, such a link may be provided, at least in part, by a cellular network, a wireless network, a wired network, or the like.

Each mobile device typically includes a unique identifier, such as a global unique identifier ("GUID") or the like, so as to enable each mobile device to be uniquely recognized and accessed by an IPR system. Each mobile device may include identification information for the entity to which it is associated, if any. Such information may be maintained in a profile or the like, such as an entity profile or a role profile as described in connection with FIG. 2. For example, mobile device 114 is shown associated with entity 112, a person, and may include identifying information for person 112 sufficient for intent prediction and response purposes. In one example, when the entity is a person, the identity information includes name, address, and other contact and identification information. Other information may include birth date, biometric information, license information (such as a driver's license number, state, etc.), passport information, employee identification information, health information (such as blood type, disability descriptions, doctor information, etc.), emergency contact information, or the like. One purpose of such entity information is to uniquely identify the entity associated with the mobile device. If the entity is a vehicle, animal or some other object, data, or the like, the identity information maintained is generally sufficient for intent prediction and response purposes. Such entity information may be stored in a profile or the like.

A mobile device may be a "dumb" device, capable of limited data storage and communication capability. Such limited communication capability, for example, may be limited to short-distance radio frequency ("RF") or infrared ("IR") communication or the like. Such limited storage capability for example, may include providing limited data storage and identification information, such as with some types of electronic badge. Further limitations may include periodic versus continuous communications, reply-only communications, or the like. With such a dumb device, most or all intent prediction and response processing may be performed remotely by other mobile devices and/or IPR servers, such as server 140.

In another example, a "smart" mobile device may include local intent prediction and response data storage and processing capability. For example, such a smart device may download and/or generate intent models, data and other information during communication with other mobile devices and/or IPR servers, and be capable of processing such information even when later out of communication with such devices and/or servers. Such a smart device may also be capable of establishing ad-hoc networks with other devices, of federating with other devices, and sharing information about associated managed entities and/or intent models.

An IPR environment may include IPR servers, such as server 140, coupled to network 180 via communication links, such as link 142. Such communication links may be wireless or wired links or any other type of link suitable to the server being utilized. Such servers may be coupled 160 to IPR data stores, such as database 150, which may be local or remote to a server. Such servers may host IPR software sufficient to enable the configuration and management of entities, sensors, IPR functionality, or the like. IPR servers may alternatively be implemented as a web service providing IPR functionality, or as some other type of centralized or distributed service. In an alternative example, an IPR system may not include any IPR servers.

IPR servers, such as example IRP server 140, may host portions of an IPR system including intent models and/or persistent IPR data. IRP servers may be any device or mechanism that provides access to data or information useful for intent prediction or response purposes. The term "device" as used herein may refer to a mobile device, an IRP server, or any other device, system, server, service, computer, or data source capable of providing processing, data, or information useful in intent prediction or response. Such devices may be include or be associated with a data store, such as database 150. Such a data store may be maintained via any persistent media, such as non-volatile memory, magnetic media such as a disk drive or tape, or the like. Such devices may be associated with multiple IPR systems, with such associations changing over time as required for intent prediction and response purposes.

In some situations, such as with a person entity carrying a mobile device such as a cell phone, mobile computer, personal data assistant, or the like, it may be desirable to periodically validate that the correct person is in current possession of the mobile device. In one example, authentication and validation may be accomplished by periodically requiring a log-on, such as with a private password, or via a biometric scan, such as a finger print, iris scan, voice print, or the like. In another example, such an authentication and validation may be required at a particular point in time. In general, the purpose of such authentication and validation is typically to verify that the mobile device is currently in the possession of the correct entity.

IPR environment 100 may also include sensors, such as sensor 130. Such sensors may be coupled to example network 180 via communication links, such as example link 132, and thereby coupled to devices such as mobile device 114. Such a coupling may be direct or via some intermediary system. Alternatively, some sensors may be directly connected to a mobile device. Communication links, such as link 132, may be wireless or wired links or any other type of link suitable to the sensor.

Such sensors may be configured to monitor ambient, environmental or other conditions suitable for intent prediction and response purposes. For example, various sensors may be positioned at or around areas of interest so as to monitor weather conditions, degree of daylight, noise, moisture, temperature, or any other environmental condition of interest. In another example, a sensor may be a smoke alarm, a burglar alarm, a carbon monoxide detector, or the like. In yet another example, a sensor may monitor for power outages, natural gas pressure, phone line functionality, or the like.

Other example sensors may monitor speed, altitude, acceleration, direction, position, movement, road conditions, or the like. Yet other example sensors may be applied to persons, animals, or other living creatures to monitor vital signs such as heart rate, blood pressure, brain wave activity, stress, or the like. Yet other example sensors include data access mechanisms, such as an interface to information in a database or to data describing attributes of objects, such as the current position of an elevator, parking garage space availability, occupancy of a meeting room, current usage status of a bathroom, or the like. In short, and without limitation, a sensor may provide data or information about any real or virtual object, attribute, condition, entity, data, or the like.

A sensor typically includes a unique identifier, such as a global unique identifier ("GUID") or the like, so as to enable the sensor to be uniquely recognized and accessed by an IPR system. Additional sensor management, control, discovery, and access mechanisms may also be employed in IPR environment 100.

In many cases a single device may not have all the information required to disambiguate intent. Multiple devices and/or sensors may be required to gather sufficient data and/or event sequence information. For example, multiple devices coupled to distinct sets of sensors with various sensor abilities distributed at different locations within an environment may provide distinct sources or viewpoints of event sequences. Some devices may report real-time information while others may report historical information, such as longer-term caches of evidential patterns. For example, a fixed-position camera sensor may not be able to accurately see how many people are in a group, but an antenna sensor may be employed to determine how many distinct cell phone hand-shake signals are detected from the group, the combined data from the sensors potentially providing a more accurate estimate of the size of the group.

The term "intent" as used herein refers to something planned or the purpose behind some sequence of events, even when all of the sequence has yet to unfold. Intent may be applied to a human being wherein it is typically embodied in the thoughts and mind of the human being. Intent as used herein may also be applied to non-cognitive entities, animals, objects, data, or anything else. In this case, intent refers to the plan, meaning, purpose, or the like behind the existence of, the activity of, the variation in, or the like of such an entity.

Figure 2:
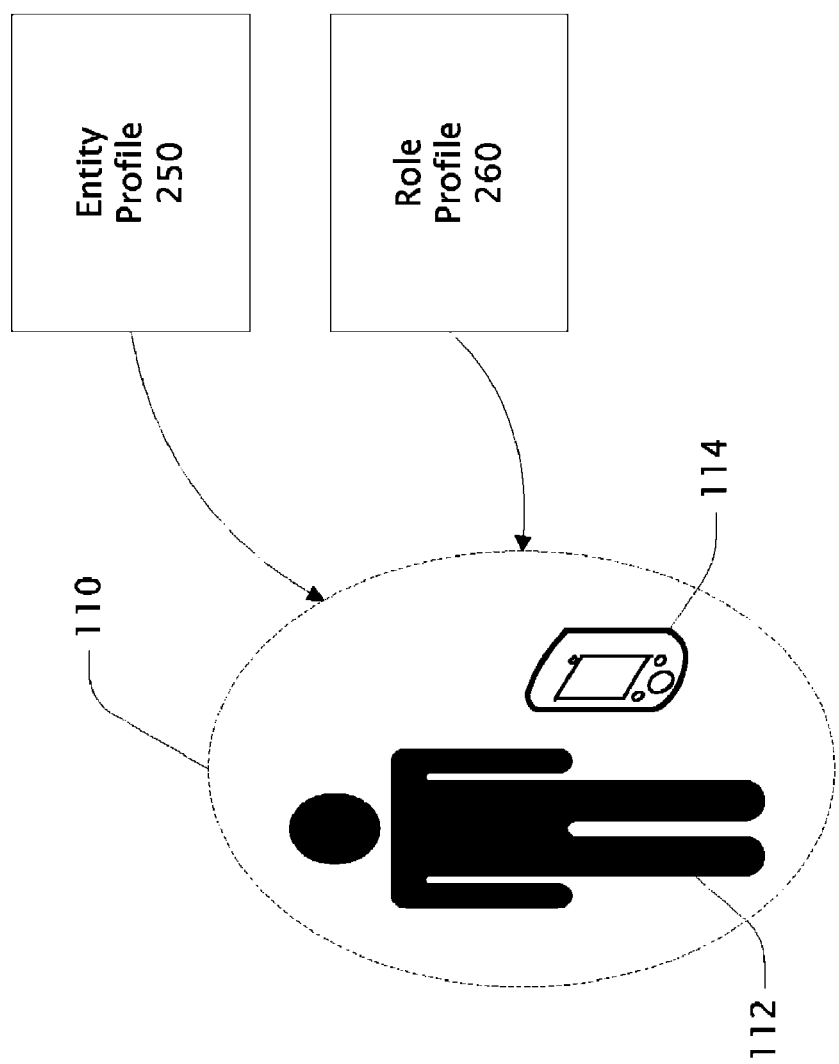
FIG. 2 is block diagram showing example profiles usable in an intent prediction and response ("IPR") environment.

FIG. 2 is block diagram showing example profiles usable in an intent prediction and response ("IPR") environment 100. Managed entity 110, comprising person 112 and associated mobile device 114, may include one or more profiles, such as example profiles 250 and 260. Example entity profile 150 typically includes data and information specific to a managed entity, such as entity 110. Such an entity profile is typically unique to the entity with which it is associated. In addition to information descriptive of the entity, such a profile typically includes intent prediction and response data that tends to be modified and augmented over time by an IRP system. Such IPR data may be maintained in a secure manner and may include access control provisions so as to limit unauthorized access.

One or more role profiles, such as example role profile 260, may also be associated with an entity. A role profile typically includes descriptive information and IPR data related to a role associated with the entity. For example, given that entity 110 is a person, an associated role profile may be an Employee Profile that includes data and information common to all employee entities having such a profile, as well as data specific to employee entity 110. An entity may include multiple role profiles. For example, entity 110 may also be a father and include a Father Profile, may be an organ donor and include a Donor Profile, etc. Further, an entity may include transient profiles, such as a Bus Rider Profile that is associated with an entity while riding a bus or while holding a valid bus pass, or a Patient Profile while the entity is registered in a hospital, or the like.

In another example, a vehicle may also be a taxi cab and include a Taxi Cab role profile in addition to a Vehicle identity profile. Such a vehicle, along with all other related vehicles, may also include a Company Asset role profile and a State Vehicle Registration role profile, for example. Such profiles may be associated with an entity manually or automatically by an IPR or related system.

Figure 3:
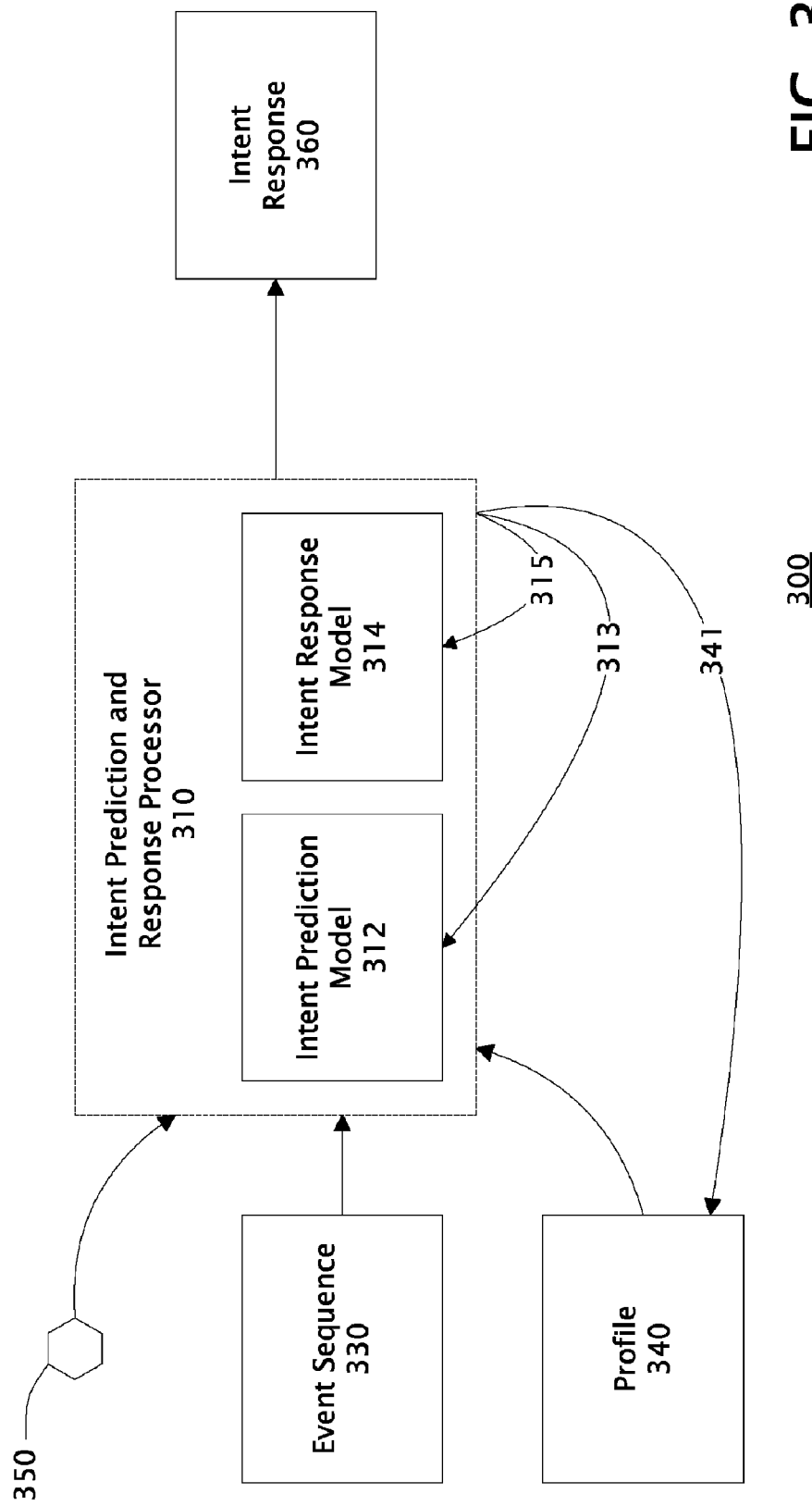
FIG. 3 is a block diagram showing an example intent prediction and response system.

FIG. 3 is a block diagram showing an example intent prediction and response system 300. At the core of system 300 is an intent prediction and response processor 310 that may be centralized or distributed. Processor 310 may be implemented in hardware, software, or in a combination of hardware, software, and/or firmware. Inputs to processor 310 may include: sensor data from various sensors, such as example sensor 350; event sequence 330 information; and profile 340 information, such as from identity and/or role profiles. Such inputs are typically used to feed one or more intent models, such as example intent prediction model 312 and/or example intent response model 314. In one example, processor 310 processes model 312 resulting in an intent prediction. The intent prediction may be feed into an intent response model 314, along with other data including sensor data, profile data, and event sequence data. Intent response model 314 is processed by processor 310 typically resulting in an intent response 360. In some examples the intent prediction model and intent response model may be combined into a single intent model. Upon establishment of an intent response, such a response is typically carried out by an IRP system.

System 300 may be a learning system capable of detecting patterns in entity behavior and resulting in the modification and augmentation ("feedback") of profile data, model structure and data, and the like. Examples of such feedback are indicated in FIG. 3 by arrows 313, 315, and 341. In one example, an IPR system learns that entity "Bob" typically sends a status email to his manager on Friday afternoons. The email is typically addressed to the manager and is given a subject line of "Weekly status". Bob typically copies the content of the same spreadsheet into the message body. The IPR system learns this behavior and, when it detects the event sequence of Bob addressing an email to his manager on a Friday afternoon with a subject line of "Weekly status", the system generates an intent prediction and response that automatically retrieves and copies the spreadsheet content into the message body.

In another example, IPR system 300 may be a non-learning system performing intent prediction and response based upon pre-programmed condition/response sequences. In yet another example, system 300 may support pre-programmed intent prediction and response "seeds" establishing a baseline operation, and then further "learn" based, at least in part, on event sequences received over time for improved intent prediction and response.

In yet another example, IPR system 300 may employ logical reasoning processes to identify intent consistent with event sequence information. Additionally or alternatively, IPR system 300 may employ a statistical methodology for calculating and assigning probabilities to different intents. Further, such a system 300 may compute the value of additional data not yet considered, and thus identify other sensors or the like from which data may be obtained to further discriminate among possible hypotheses of intent. The computation of the value of additional data may be performed, at least in part, because access to data and/or sensors may have an associated monetary cost. IPR system 300 may make use of such value computations to evaluate the monetary costs versus intent prediction and response benefits of accessing additional data and/or sensors.

In one example, intent prediction and response models are maintained in an IPR data store. In an alternative example, such models are distributed among an IPR system's mobile and other devices or maintained entirely by specific devices. In one example, an entity's intent prediction model is maintained in an entity's electronic badge, a copy of the model being transferred to other devices as required for intent prediction and response purposes. In another example, an intent response model is maintained in an IPR server and accessed as required for intent prediction and response purposes.

Sensors utilized by IPR system 300 may be explicitly associated with system 300 or may be unrelated and accessed in a transitory manner. In one example, an IPR system includes a sensor that is an electronic badge reader. In an alternative example, an IRP system discovers an unrelated source of stock price information and accesses such data on an as-needed basis. In yet another example, a mobile device, such as a cell phone, includes a GPS receiver that is accessed for position information by an IPR system. Another example sensor is a contextual beacon, a device that monitors and transmits some ambient data, such as local temperature, such that the data can be accessed by an IPR system. Such sensors may be associated with and/or discovered and accessed by multiple IPR systems.

Figure 4:
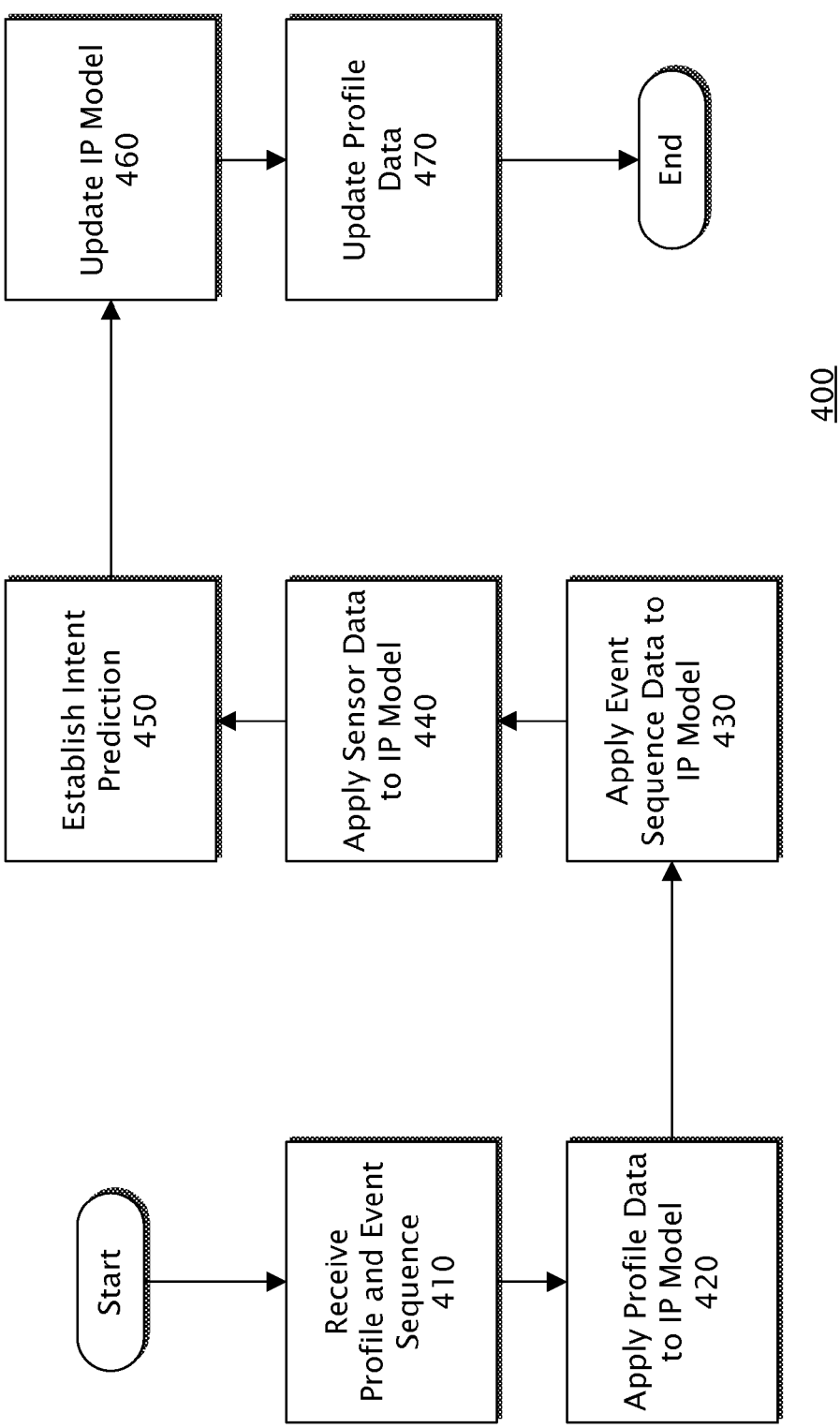
FIG. 4 is a block diagram showing an example intent prediction process.

FIG. 4 is a block diagram showing an example intent prediction process 400. The process starts at block 410 upon receipt of event sequence information along with a profile related to the event sequence information. Event sequence information is typically bounded and based upon a discrete set of events rather than a continuous event sequence. Such a discrete event sequence may be a portion of a continuous event sequence. Process 400 may be repeated for additional discrete portions of the continuous event sequence. For example, Bob may be talking on his cell phone while driving his car. Bob and his car, "Car A", are both managed entities. An IRP system may receive a profile for Car A and a related event sequence, "entering parking garage". The system may have previously received a profile for "Bob" and an associated event sequence, "talking on cell phone".

Block 420 indicates applying profile information to an intent prediction model. For example, the IPR system may extract relevant data from Car A's entity profile and apply that data to an intent prediction model for Car A. The IPR system may have previously extracted relevant data from Bob's entity profile and applied that data to an intent prediction model for Bob.

Block 430 indicates applying event sequence information to an intent prediction model. For example, the IPR system may apply Car A's "entering parking garage" event sequence to the intent prediction model for Car A. The IPR system may have previously applied Bob's "talking on cell phone" event sequence to the intent prediction model for Bob.

Block 440 indicates applying sensor data to an intent prediction model. For example, the IPR system may sense data that indicates Bob is inside Car A and the cellular network Bob is currently using does not have sufficient signal strength inside the parking garage Car A is entering. The IPR system may also sense data that indicates that Car A typically parks in the parking garage on the current day of the week at about the current time. The IPR system may further determine that additional data may be useful in establishing an intent prediction and calculate the value of such data. Conditioned on a cost/benefit analysis or the like, the IPR system may locate appropriate sensors or data sources and retrieve the additional data. Sensor data and the like is typically applied to appropriate intent prediction models.

Block 450 indicates establishing an intent prediction. For example, the IPR system may process Car A's intent prediction model along with the applied information and data, resulting in the establishment of the intent prediction, "Car A intends to park in the parking garage". The IPR system may further process Bob's intent prediction model resulting in the intent prediction, "Bob intends to talk on his cell phone inside the parking garage."

Block 460 indicates updating an intent prediction model based upon the establishment of an intent prediction, the event sequence information and the related profile. For example, Bob's intent prediction model may be updated based upon input data and the established intent prediction so as to facilitate improved future intent prediction and response.

Block 470 indicates updating a profile based upon the establishment of an intent prediction. For example, Bob's entity profile may be updated based upon input data and the established intent prediction so as to facilitate improved future intent prediction and response.

The established intent prediction may be used, along with other data and information, to help establish an intent response as described in connection with FIG. 5.

Figure 5:
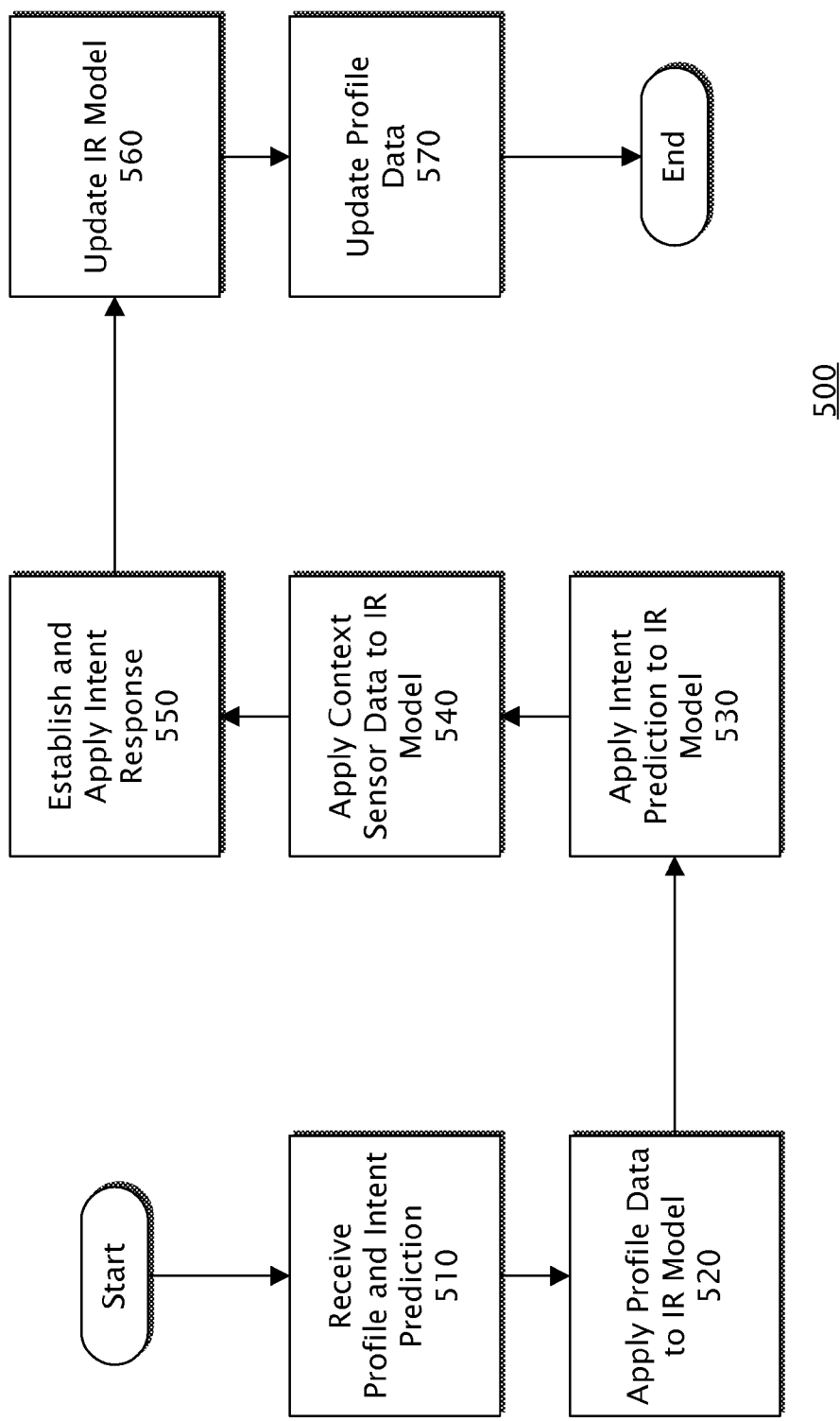
FIG. 5 is a block diagram showing an example intent response process.

FIG. 5 is a block diagram showing an example intent response process 500. The process starts at block 510 upon receipt of intent prediction information along with a profile related to the intent prediction information.

Block 520 indicates applying profile information to an intent response model. For example, the IPR system may extract relevant data from Car A's entity profile and apply that data to an intent response model for Car A.

Block 530 indicates applying intent prediction information to an intent response model. Such an intent prediction may be generated by an intent prediction process such as that described in connection with FIG. 4. For example, the IPR system may apply the intent prediction, "Car A intends to park in the parking garage" to the intent response model for Car A. The IPR system may further apply the intent prediction, "Bob intends to talk on his cell phone inside the parking garage" to the intent response model for Bob.

Block 540 indicates applying sensor data to an intent response model. For example, the IPR system may sense data that indicates an alternative cellular-network compatible with Bob's cell phone is available within the parking garage. The system may further sense data that indicates the parking garage is full except for spots 34 and 42 on level 5, and that only spot 42 is large enough to accommodate Car A. The IPR system may further determine that additional data may be useful in establishing an intent response and calculate the value of such data. Conditioned on a cost/benefit analysis or the like, the IPR system may locate appropriate sensors or data sources and retrieve the additional data.

Block 550 indicates establishing an intent response. For example, the IPR system may process Car A's intent response model along with the applied information and data, resulting in the establishment of the intent response, "Send text message to Bob's cell phone indicating that only spot 42 on level 5 can accommodate Car A for parking". The IPR system may further process Bob's intent response model resulting in the intent response, "Switch Bob's cell phone to the garage network upon entry to the garage."

Block 560 indicates updating an intent response model based upon the establishment of an intent response and a related profile. For example, Bob's intent response model may be updated based upon input data and the established intent response so as to facilitate improved future intent prediction and response.

Block 570 indicates updating a profile based upon the establishment of an intent response. For example, Bob's entity profile may be updated based upon input data and the established intent response so as to facilitate improved future intent prediction and response.

Upon establishment of an intent response, such a response is typically carried out by elements of the IRP system.

Figure 6:
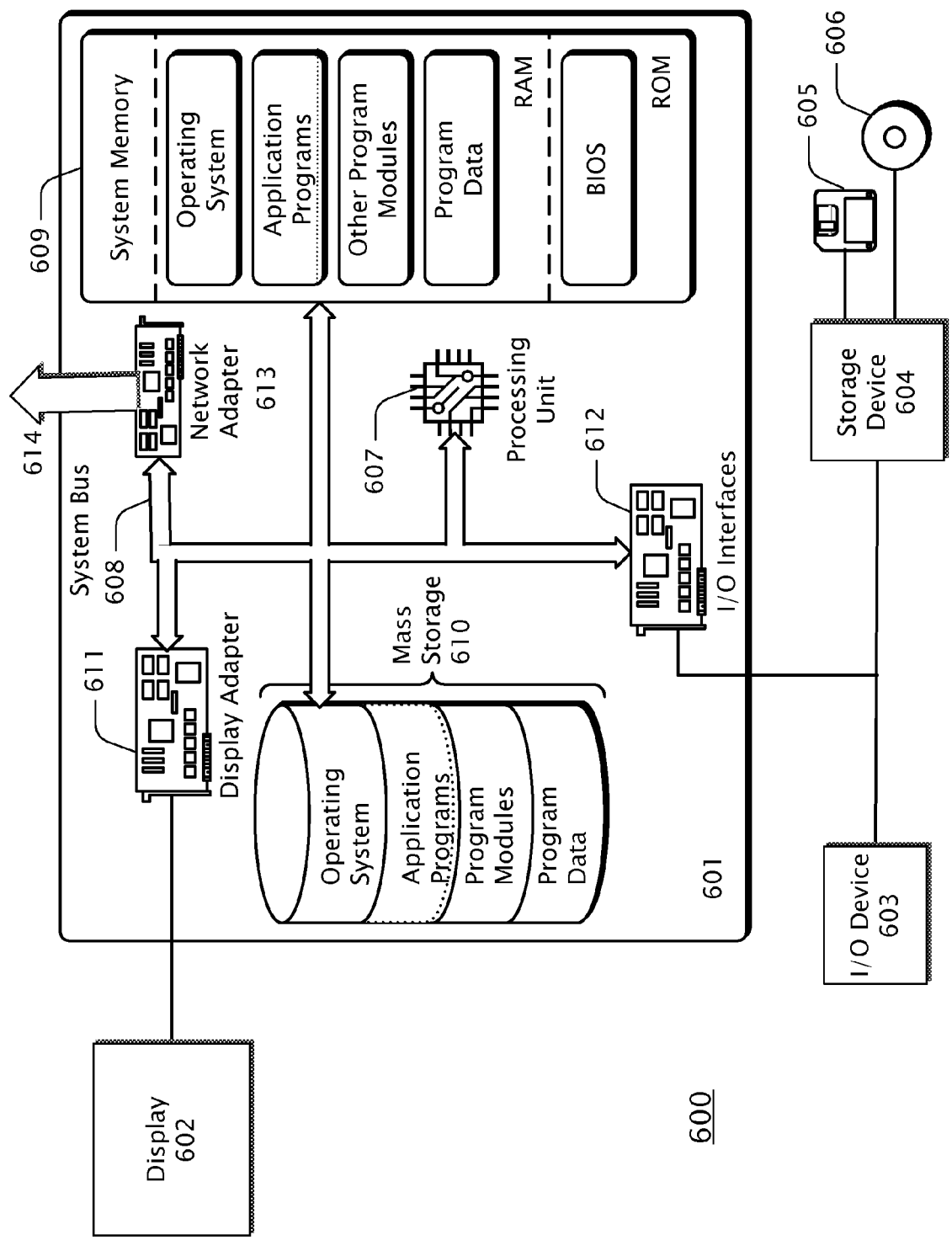
FIG. 6 is a block diagram showing an example device or computing environment in which the technology described herein above may be implemented.

FIG. 6 is a block diagram showing an example device or computing environment 600 in which the technology described herein above may be implemented. A suitable computing environment may be implemented with numerous general purpose or special purpose systems. Examples of well known systems may include, but are not limited to, cell phones, personal data assistants ("PDA"), personal computers ("PC"), hand-held or laptop devices, microprocessor-based systems, multiprocessor systems, servers, workstations, consumer electronic devices, set-top boxes, and the like. Some devices, such as electronic badges, tags, sensors, implantable devices, or the like may be more or less complex than example computing environment 600.

Computing environment 600 generally includes a general-purpose computing system in the form of a computing device 601 coupled to various peripheral devices 602, 603, 604 and the like. System 600 may couple to various input devices 603, including voice recognition, touch pads, buttons, keyboards and/or pointing devices, such as a mouse or trackball, via one or more I/O interfaces 612. The components of computing device 601 may include one or more processors (including central processing units ("CPU"), graphics processing units ("GPU"), microprocessors ("µP"), and the like) 607, system memory 609, and a system bus 608 that typically couples the various components. Processor 607 typically processes or executes various computer-executable instructions to control the operation of computing device 601 and to communicate with other electronic and/or computing devices, systems or environment (not shown) via various communications connections such as a network connection 614 or the like. System bus 608 represents any number of several types of bus structures, including a memory bus or memory controller, a peripheral bus, a serial bus, an accelerated graphics port, a processor or local bus using any of a variety of bus architectures, and the like.

System memory 609 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 609 typically stores data, computer-executable instructions and/or program modules comprising computer-executable instructions that are immediately accessible to and/or presently operated on by one or more of the processors 607.

Mass storage devices 604 and 610 may be coupled to computing device 601 or incorporated into computing device 601 via coupling to the system bus. Such mass storage devices 604 and 610 may include non-volatile RAM, a magnetic disk drive which reads from and/or writes to a removable, non-volatile magnetic disk (e.g., a "floppy disk") 605, and/or an optical disk drive that reads from and/or writes to a non-volatile optical disk such as a CD ROM or DVD ROM 606. Alternatively, a mass storage device, such as a hard disk, may include non-removable storage medium. Other mass storage devices may include memory cards, memory sticks, tape storage devices, and the like.

Any number of computer programs, files, data structures, and the like may be stored on mass storage device 610, other storage devices 604, 605, 606 and system memory 609 (typically limited by available space) including, by way of example and not limitation, operating systems, application programs, data files, directory structures, and computer-executable instructions.

Output devices, such as display device 602, may be coupled to the computing device 601 via an interface, such as display adapter 611. Output device 602 may be a liquid crystal display ("LCD"). Other types of output devices may include printers, audio outputs, voice outputs, tactile devices or other sensory output mechanisms, cathode ray tube ("CRT") displays, or the like. Output devices may enable computing device 601 to interact with human operators or other machines or systems. A user may interface with computing environment 600 via any number of different input devices 603 such as voice recognition, touch pads, buttons, a keyboard, mouse, joystick, game pad, data port, and the like. These and other input devices may be coupled to processor 607 via input/output interfaces 612 which may be coupled to system bus 608, and may be coupled by other interfaces and bus structures, such as a parallel port, game port, universal serial bus ("USB"), fire wire, infrared port, and the like.

Computing device 601 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 601 may be coupled to a network via network adapter 613 or the like, or, alternatively, via a modem, digital subscriber line ("DSL") link, integrated services digital network ("ISDN") link, Internet link, wireless link, or the like.

Communications connection 614, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code or data maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. An intent prediction and response system comprising:
an intent prediction and response processor implemented in a computing device;
an intent model for processing by the intent prediction and response processor wherein the intent model is comprised of an intent prediction model and an intent response model;
a communication link configured to couple a sensor to the intent prediction and response processor;
an event sequence input configured to receive event sequence information of a managed entity for processing by the intent prediction and response processor; and
a profile input configured to receive a profile for processing by the intent prediction and response processor, wherein the profile is at least one of an entity profile or a role profile and wherein the profile is associated with the event sequence, and wherein the intent prediction and response processor is configured to establish an intent prediction for the managed entity based at least in part on the intent model and data from the sensor and the event sequence information, the intent prediction predicting future intent of the managed entity.

2. The system of claim 1 wherein the intent prediction and response processor establishes an intent prediction.

3. The system of claim 1 wherein the intent prediction and response processor establishes an intent response.

4. The system of claim 3 wherein the intent response is carried out by the system.

5. The system of claim 1 wherein the system is configured to modify the intent model or the profile in response to feedback.

6. A method for establishing an intent prediction, the method comprising:
receiving an event sequence of a managed entity;
receiving a profile associated with the event sequence, the profile including a unique identification of the managed entity, wherein the profile is at least one of an entity profile or a role profile;
applying data from the event sequence and the profile to an intent prediction model;
establishing an intent prediction based at least in part on the intent prediction model and the data, the intent prediction predicting future intent of the managed entity, the method performed by a computing device; and
providing feedback based at least in part on the intent prediction, the feedback including modification of the intent prediction model or the profile.

7. The method of claim 6 further comprising coupling to one or more sensors wherein the data includes information from at least one of the one or more sensors.

8. A method for establishing an intent response, the method comprising:
receiving an intent prediction, the intent prediction predicting future intent of a managed entity;
receiving a profile associated with the intent prediction, the profile including a unique identification of the managed entity, wherein the profile is at least one of an entity profile or a role profile;
applying data from an event sequence of the managed entity and the profile to an intent response model;
establishing an intent response based at least in part on the intent response model and the data; and
providing feedback based at least in part on the intent response, the feedback including modification of the intent response model or the profile, the method performed by a computing device.

9. The method of claim 8 further comprising coupling to one or more sensors wherein the data includes information from at least one of the one or more sensors.

* * * * *